(12) United States Patent
Kwon et al.

(10) Patent No.: US 11,400,792 B2
(45) Date of Patent: Aug. 2, 2022

(54) INTERIOR TEMPERATURE SENSOR FOR VEHICLE

(71) Applicants: Hyundai Motor Company, Seoul (KR); KIA Motors Corporation, Seoul (KR)

(72) Inventors: Dong Ho Kwon, Yongin-si (KR); Gee Young Shin, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 414 days.

(21) Appl. No.: 16/197,604

(22) Filed: Nov. 21, 2018

(65) Prior Publication Data
US 2020/0114727 A1 Apr. 16, 2020

(30) Foreign Application Priority Data

Oct. 11, 2018 (KR) .......................... 10-2018-0121389

(51) Int. Cl.
*B60H 1/00* (2006.01)
*G01K 1/20* (2006.01)
*G01K 1/14* (2021.01)

(52) U.S. Cl.
CPC ....... *B60H 1/00807* (2013.01); *B60H 1/0075* (2013.01); *G01K 1/14* (2013.01); *G01K 1/20* (2013.01); *G01K 2201/02* (2013.01)

(58) Field of Classification Search
CPC .... B60H 1/00807; B60H 1/0075; G01K 1/20; G01K 1/14; G01K 2201/02

USPC ........................... 374/29, 120–121, 141, 208
See application file for complete search history.

(56) References Cited

U.S. PATENT DOCUMENTS

| | | | | |
|---|---|---|---|---|
| 5,720,181 A | * | 2/1998 | Karl | B60H 1/00735 165/248 |
| 7,841,768 B2 | * | 11/2010 | Regensburger | B60H 1/00792 374/141 |
| 2002/0048308 A1 | * | 4/2002 | Knittel | G01K 1/20 374/141 |
| 2002/0110178 A1 | * | 8/2002 | Puranen | G01J 5/04 374/121 |

(Continued)

FOREIGN PATENT DOCUMENTS

FR 2880946 A1 * 7/2006 ............... G01K 1/14

*Primary Examiner* — Lisa M Caputo
*Assistant Examiner* — Janice M Soto
(74) *Attorney, Agent, or Firm* — Lempia Summerfield Katz LLC

(57) ABSTRACT

The present disclosure relates to an interior temperature sensor for a vehicle. The sensor includes a sensor casing disposed to expose a sensing surface to a space that is the subject of temperature measurement, a substrate extending in a direction from an inside of the sensing surface toward an outside while at least a part of the substrate bisects an inside of the sensor casing into upper and lower sections, an upper temperature sensing element provided on an upper surface of the substrate at a position inside the sensor casing, a lower temperature sensing element provided on a lower surface of the substrate at a position inside the sensor casing, and a compensation temperature sensing element provided on the substrate to be placed outside the sensor casing. Furthermore, a microcomputer determines an interior temperature of the vehicle based on the measured values.

9 Claims, 5 Drawing Sheets

(56) References Cited

U.S. PATENT DOCUMENTS

| | | | |
|---|---|---|---|
| 2004/0151229 A1* | 8/2004 | Ruettiger | G01J 5/02 374/121 |
| 2004/0223534 A1* | 11/2004 | Trapp | B60H 1/00792 374/172 |
| 2013/0034120 A1* | 2/2013 | Hentschel | G01K 1/20 374/142 |

* cited by examiner

INTERIOR TEMPERATURE SENSOR FOR VEHICLE

CROSS REFERENCE TO RELATED APPLICATION

This application claims priority to and the benefit of Korean Patent Application No. 10-2018-0121389, filed on Oct. 11, 2018, which is incorporated herein by reference in its entirety.

FIELD

The present disclosure generally relates to an interior temperature sensor of a vehicle for measuring an interior temperature of the vehicle.

BACKGROUND

The statements in this section merely provide background information related to the present disclosure and may not constitute prior art.

Interior temperature sensors for vehicles are generally classified into an air suction type interior temperature sensor configured to inhale air inside the interior space of the vehicle and measures the temperature of the air, and a non-suction type interior temperature sensor configured to measure the temperature of the interior space of the vehicle without inhaling air.

The air suction type interior temperature sensor has advantages that the operational reliability of measuring temperature is high and a sensing logic is relatively simple because the sensor inhales the air inside the vehicle and directly measures the temperature of the inhaled air. However, in this sensor, a grill structure is required for inhaling air into the sensor. Therefore, the sensor is unaesthetic in appearance, requires a flow generating apparatus for flowing air, and has a higher manufacturing cost.

Whereas, the non-suction type interior temperature sensor does not require the grill structure, so the sensor may be formed freely in design of the appearance, and have relatively low manufacturing cost, but the operational reliability of measuring the temperature by the sensor is relatively low.

The above information disclosed in this Background section is only for enhancement of understanding of the background of the present disclosure, and therefore it may contain information that does not form the prior art that is already known to a person of ordinary skill in the art.

SUMMARY

The present disclosure provides a non-suction type interior temperature sensor for a vehicle, which can be freely designed in its appearance without any limitation, has an advantage of low manufacturing cost, and improves the operational reliability of measuring the interior temperature of the vehicle.

The present disclosure provides an interior temperature sensor for a vehicle. The sensor includes a sensor casing disposed to expose a sensing surface thereof to a space that is a subject of temperature measurement, a substrate extending in a direction from an inside of the sensing surface toward an outside while at least a part of the substrate bisects an inside of the sensor casing into upper and lower sections, an upper temperature sensing element provided on an upper surface of the substrate at a position inside the sensor casing, a lower temperature sensing element provided on a lower surface of the substrate at a position inside the sensor casing, and a compensation temperature sensing element provided on the substrate to be placed outside the sensor casing.

The substrate may be inserted into the sensor casing for separating an upper space inside the sensor casing in which the upper temperature sensing element is exposed and a lower space inside the sensor casing in which the lower temperature sensing element is also exposed.

In addition, the interior temperature sensor for vehicle may further include a blocking member sealing an inside of the sensor casing where the upper temperature sensing element and the lower temperature sensing element are provided, thereby allowing the upper temperature sensing element, the lower temperature sensing element, and the compensation temperature sensing element to be independent from each other in a convective heat transfer. The blocking member may be made of an insulative material.

The space that is the subject of temperature measurement may be an interior space of the vehicle and the sensing surface of the sensor casing may form a vertical surface facing toward the interior space of the vehicle.

In addition, the interior temperature sensor for vehicle may further include a microcomputer for receiving sensing values of the upper temperature sensing element, the lower temperature sensing element, and the compensation temperature sensing element, thereby determining interior temperature of the vehicle.

When the microcomputer determines that the sensing values of the upper temperature sensing element and the lower temperature sensing element are in a predetermined same range, the microcomputer may output an average value of the sensing values of the upper temperature sensing element and the lower temperature sensing element as the interior temperature of the vehicle.

When the sensing value of the upper temperature sensing element is higher than the sensing value of the lower temperature sensing element, and a solar radiation sensor senses that sunlight is incident on the vehicle, the microcomputer may determine whether the sunlight radiated to the vehicle is directly incident on the sensing surface of the sensor casing or not, and the determination is performed on the basis of a frequency of changing of a difference between the sensing value of the upper temperature sensing element and the sensing value of the lower temperature sensing element, a grade of the sensing value of the upper temperature sensing element, and a grade of the sensing value of the lower temperature sensing element.

When the frequency of changing of the difference between the sensing value of the upper temperature sensing element and the sensing value of the lower temperature sensing element exceeds a predetermined reference frequency, the grade of the sensing value of the upper temperature sensing element exceeds a predetermined first reference grade, and the grade of the sensing value of the lower temperature sensing element exceeds a predetermined second reference grade, the microcomputer may determine that the sunlight is directly incident on the sensing surface of the sensor casing, and as the interior temperature of the vehicle output a value obtained by multiplying a weighting value by the average value of the sensing values of the upper temperature sensing element and the lower temperature sensing element, and subtracting the multiplied value from the average value without multiplying by the weighting value obtained in consideration of an error generated by direct incidence of the sunlight on the sensing surface of the sensor casing.

When the sensing value of the upper temperature sensing element is higher than the sensing value of the lower temperature sensing element, and a signal from a solar radiation sensor indicates that sunlight is not incident on the vehicle, the microcomputer may determine that disturbance is occurred due to a heat source other than the sun, and maintain an output value of the interior temperature of the vehicle at a previous state for a predetermined first reference time.

When a state where the sensing value of the lower temperature sensing element is maintained higher than the sensing value of the upper temperature sensing element for a predetermined second reference time, as the interior temperature of the vehicle, the microcomputer may output a value obtained by subtracting a correction value using a sensing value of the compensation temperature sensing element from the sensing value of the lower temperature sensing element, adding the subtracted value to the sensing value of the upper temperature sensing element, and dividing the added value by two.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
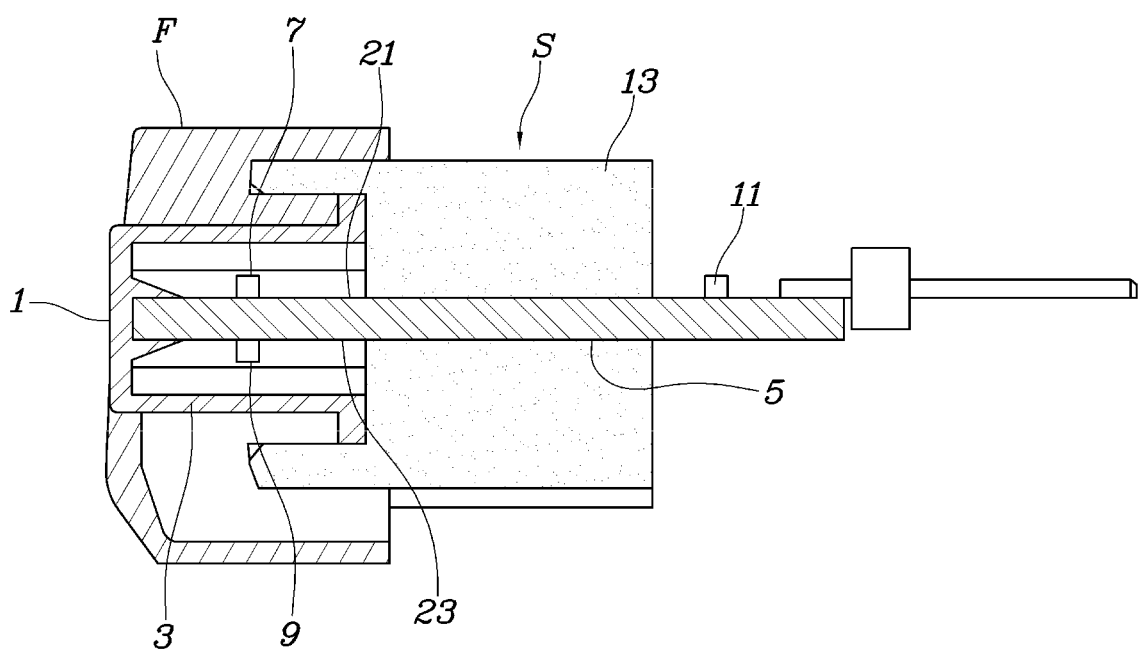
FIG. 1 is a sectional view showing a structure of an interior temperature sensor for a vehicle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
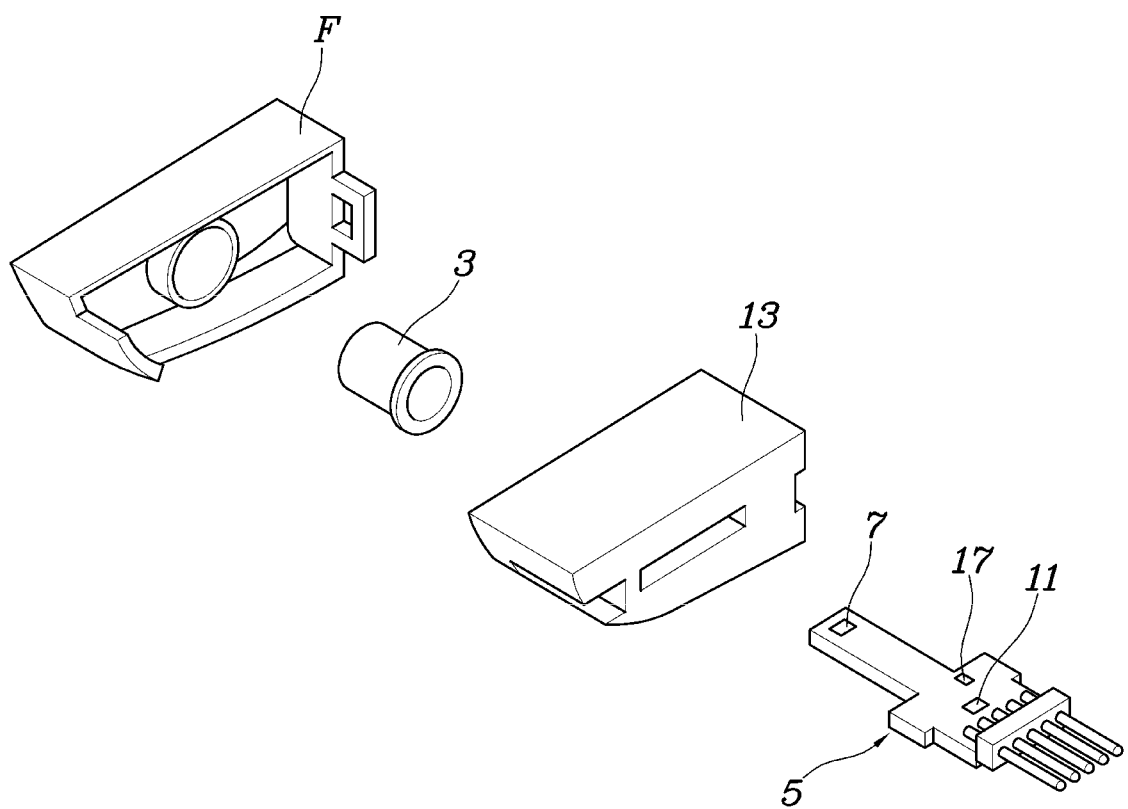
FIG. 2 is an exploded perspective view showing the interior temperature sensor of FIG. 1.
Figure 3:
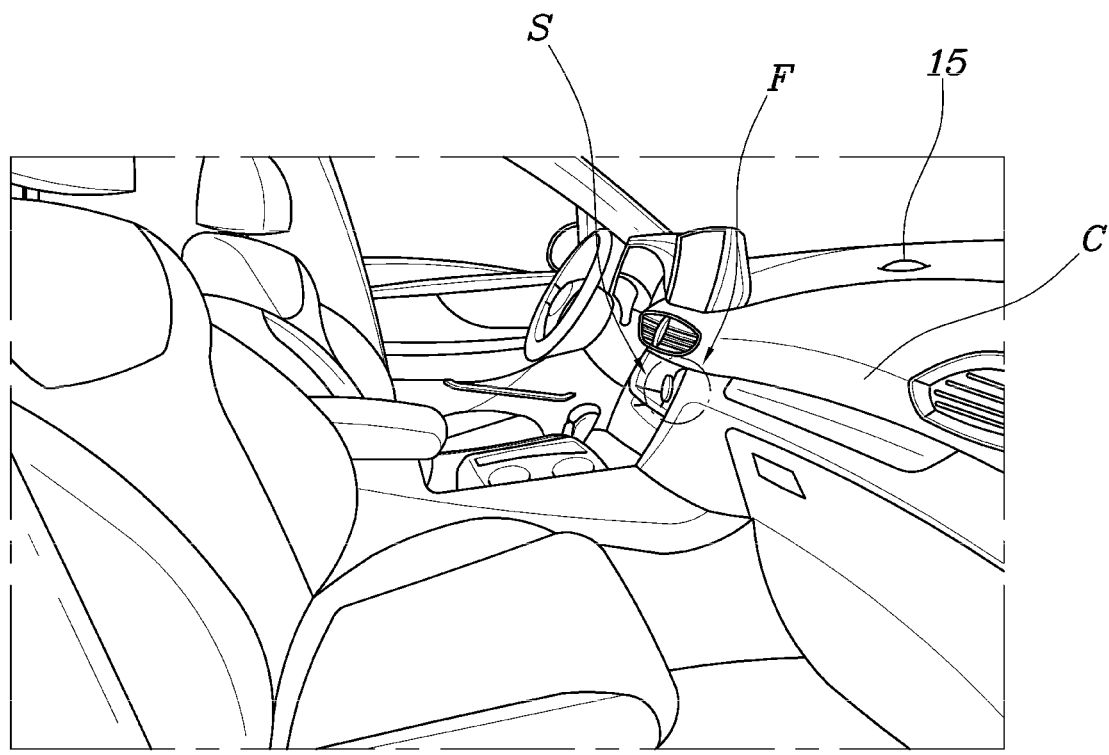
FIG. 3 is a view showing an example of mounting the interior temperature sensor on the vehicle.

Referring to FIGS. 1 to 3, a form of an interior temperature sensor S for a vehicle of the present disclosure includes a sensor casing 3 disposed to expose a sensing surface 1 thereof to a space that is the subject of temperature measurement, a substrate 5 extending in a direction from an inside of the sensing surface 1 toward an outside while at least a part of the substrate bisects an inside of the sensor casing 3 into upper and lower sections, an upper temperature sensing element 7 provided on an upper surface 21 of the substrate 5 at a position inside the sensor casing 3; a lower temperature sensing element 9 provided on a lower surface 23 the substrate 5 at a position inside the sensor casing 3, and a compensation temperature sensing element 11 provided on the upper surface 21 of the substrate 5 at a position outside the sensor casing 3.

The sensor casing 3 is made of a material having thermal conductivity to represent interior temperature of the vehicle. More particularly, the sensor casing 3 does not transfer heat by directly contacting with the upper temperature sensing element 7 and the lower temperature sensing element 9, but the sensor casing 3 is preferably made of the material capable of quickly and smoothly transferring thermal energy delivered to the sensing surface 1 to the upper temperature sensing element 7 and the lower temperature sensing element 9.

The upper temperature sensing element 7, the lower temperature sensing element 9, and the compensation temperature sensing element 11 are made of an electrical element capable of changing an electrical characteristic according to temperature and calculating temperature based on an amount of variation.

The substrate 5 is inserted into the sensor casing 3 for separating an upper space inside the sensor casing 3 in which the upper temperature sensing element 7 is exposed and a lower space inside the sensor casing 3 in which the lower temperature sensing element 9 is also exposed. Accordingly, the interior temperature sensor S according to the form of the present disclosure is configured that the upper temperature sensing element 7 and the lower temperature sensing element 9 are separated by the substrate 5 vertically from each other inside the sensor casing 3, and the compensation temperature sensing element 11 is exposed at an outside of the sensor casing 3.

According to the form of the present disclosure, the interior temperature sensor S further includes a blocking member 13 for sealing an inside of the sensor casing 3 where the upper temperature sensing element 7 and the lower temperature sensing element 9 is provided, thereby allowing the upper temperature sensing element 7, the lower temperature sensing element 9, and the compensation temperature sensing element 11 to be independent from each other in the convective heat transfer.

As shown in FIG. 1, the upper space of the sensor casing 3 where the upper temperature sensing element 7 is provided and the lower space of the sensor casing 3 where the lower temperature sensing element 9 is provided are separated by the substrate 5 from each other. In addition, the upper space of the sensor casing 3 and the lower space thereof is sealed by the blocking member 13, thereby forming separate spaces respectively. Therefore, convective heat transfer of air inside the upper space and convective heat transfer of air inside the lower space are independent without being affected by each other, and are also independent from convective heat transfer acting on the compensation temperature sensing element 11.

In addition, preferably, the blocking member 13 is made of an insulative material, thereby blocking heat transfer due to conduction from the compensation temperature sensing element 11 to the upper temperature sensing element 7 and the lower temperature sensing element 9. Furthermore, the substrate 5 is configured to have low heat conductivity, thereby blocking heat transfer due to conduction between the upper temperature sensing element 7 and the lower temperature sensing element 9, thus, preferably, each of the upper temperature sensing element 7, the lower temperature sensing element 9, and the compensation temperature sensing element 11 may perform independently for measuring temperature by reducing heat transfer to each other as much as possible.

For measuring an interior temperature of an interior space of the vehicle, the sensing surface 1 of the sensor casing 3 preferably forms a vertical surface facing toward the interior space of the vehicle. Accordingly, the sensing surface 1 of the sensor casing 3 is preferably disposed to be vertically exposed at a crash pad or a center fascia, etc. disposed at a front side of the interior space of the vehicle.

In FIGS. 1 through 3, F denotes a part of the center fascia, and these drawings illustrate that the interior temperature sensor S of the present disclosure is disposed at the center fascia F provided on the center of the crash pad C, and a solar radiation sensor 15 is disposed below a front windshield glass.

As shown in FIG. 2, the interior temperature sensor S for the vehicle of the present disclosure further includes a microcomputer 17 for receiving inputs of the upper temperature sensing element 7, the lower temperature sensing element 9, and the compensation temperature sensing element 11 thereby determining the interior temperature of the vehicle.

Figure 4:
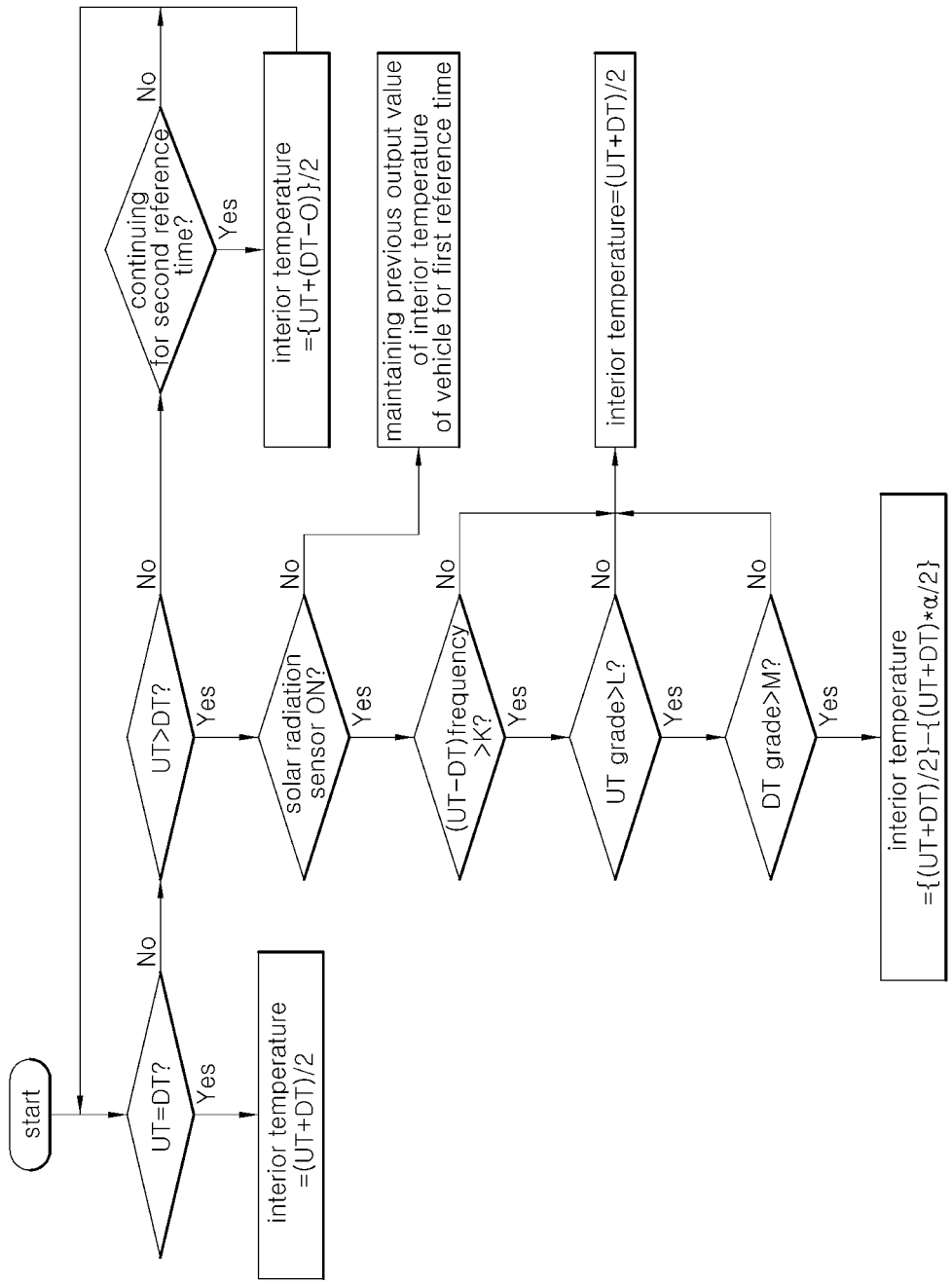
FIG. 4 is a flowchart showing an operation process of determining an interior temperature of the vehicle using the interior temperature sensor according to the form of the present disclosure.

The microcomputer 17 may be provided on the substrate 5 as a separate component being connected by a connector of the substrate 5. As shown in FIG. 4, when the microcomputer 17 determines that a sensing value UT of the upper temperature sensing element 7 and a sensing value DT of the lower temperature sensing element 9 are in a predetermined same range, the microcomputer 17 outputs an average value of the sensing value UT of the upper temperature sensing element 7 and the sensing value DT of the lower temperature sensing element 9 as the interior temperature of the vehicle. When the microcomputer 17 determines that the sensing value of the upper temperature sensing element 7 and the sensing value of the lower temperature sensing element 9 are substantially same, the microcomputer 17 outputs the average value of the sensing values as current interior temperature of the vehicle.

The predetermined same range means that the sensing values are not exactly same, but they are regarded as the same. For example, when the difference in the sensing values is in a range of 0.05° C. or less, the sensing values may be set to be determined as the same range.

When the sensing value UT of the upper temperature sensing element 7 is higher than the sensing value DT of the lower temperature sensing element 9, and the solar radiation sensor 15 senses that sunlight is incident on the vehicle, the microcomputer 17 determines whether the sunlight radiated to the vehicle is directly incident on the sensing surface 1 of the sensor casing 3 or not. The determination is performed on a basis of a frequency of changing of a difference between the sensing value UT of the upper temperature sensing element 7 and the sensing value DT of the lower temperature sensing element 9, a grade of the sensing value UT of the upper temperature sensing element 7, and a grade of the sensing value DT of the lower temperature sensing element 9.

For example, in a situation in which the sensing value UT of the upper temperature sensing element 7 is higher than the sensing value DT of the lower temperature sensing element 9, and the solar radiation sensor 15 senses that the sunlight is incident on the vehicle, when the frequency of changing of the difference between the sensing value UT of the upper temperature sensing element 7 and the sensing value DT of the lower temperature sensing element 9 exceeds a predetermined reference frequency K, the grade of the sensing value UT of the upper temperature sensing element 7 exceeds a predetermined first reference grade L, and the grade of the sensing value DT of the lower temperature sensing element 9 exceeds a predetermined second reference grade M, the microcomputer 17 determines that the sunlight is directly incident on the sensing surface 1 of the sensor casing 3.

Figure 5:
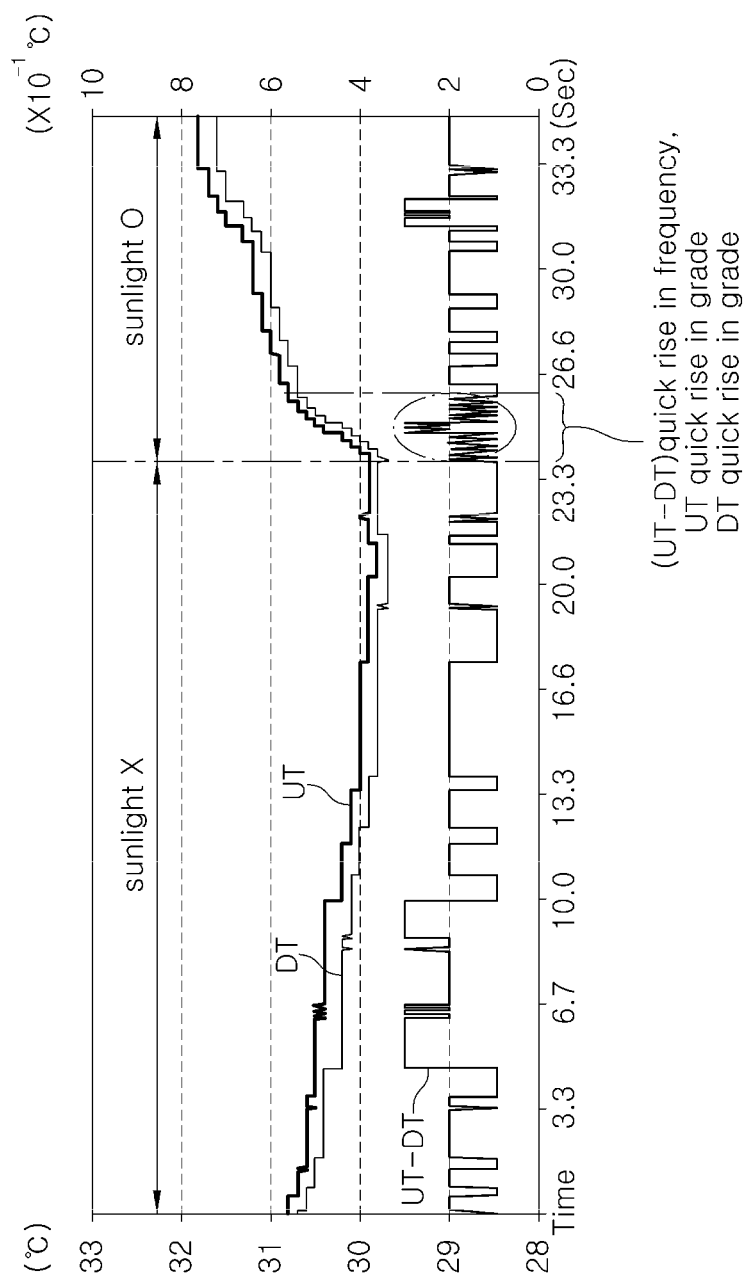
FIG. 5 is a graph showing an effect of sunlight incident on the interior temperature sensor according to the form of the present disclosure.

Thus, when the sunlight is incident on the vehicle, and the sunlight is directly incident on the sensing surface 1 of the sensor casing 3, as shown in FIG. 5, the sensing value UT of the upper temperature sensing element 7 is higher than the sensing value DT of the lower temperature sensing element 9, the frequency of changing of the difference between the sensing value UT of upper temperature sensing element 7 and the sensing value DT of the lower temperature sensing element 9 becomes equal to or higher than a predetermined level, the grade of the sensing value UT of the upper temperature sensing element 7 increases, and the grade of the sensing value DT of the lower temperature sensing element 9 also increases. Therefore, the microcomputer 17 compares these determination factors with the reference frequency K, the first reference grade L, and the second reference grade M, respectively, and determines that the average value of the sensing value UT of the upper temperature sensing element 7 and the sensing value DT of the lower temperature sensing element 9 cannot accurately represent the interior temperature of the vehicle due to sunlight directly being incident on the sensing surface 1.

Accordingly, the reference frequency K, the first reference grade L, and the second reference grade M should be selected differently for each vehicle according to area and shape of the windshield glass, interior volume, and an area and a shape of a side glass of the vehicle with the interior temperature sensor S of the present disclosure. As described above, since these factors allow the microcomputer to determine that the average value of the sensing value UT of the upper temperature sensing element 7 and the sensing value DT of the lower temperature sensing element 9 does not represent the interior temperature of the vehicle due to the sunlight being incident on the sensing surface 1, these factors are preferably determined by designing through numbers of tests or analyses.

When the microcomputer 17 determines that the average value of the sensing value UT of the upper temperature sensing element 7 and the sensing value DT of the lower temperature sensing element 9 does not represent the interior temperature of the vehicle due to the sunlight being incident on the sensing surface 1, in order to calculate a more accurate interior temperature in consideration of the situation, the microcomputer outputs a value as the interior temperature of the vehicle. The value is obtained by multiplying a weighting value a being obtained in consideration of an error generated by direct incidence of the sunlight on the sensing surface 1 of the sensor casing 3 by the average value of the sensing value UT of the upper temperature sensing element 7 and the sensing value DT of the lower temperature sensing element 9, and subtracting the multiplied value from the average value without multiplying by the weighting value.

In this case, the interior temperature can be obtained by the following expression, the interior temperature=$\{(UT+DT)/2\}-\{(UT+DT)*\alpha/2\}$.

When the sensing value UT of the upper temperature sensing element 7 is higher than the sensing value DT of the lower temperature sensing element 9, the solar radiation sensor 15 senses that the sunlight is incident on the vehicle, but when the frequency of changing of the difference between the sensing value UT of the upper temperature sensing element 7 and the sensing value DT of the lower temperature sensing element 9 is equal to or less than the reference frequency K, the grade of the sensing value UT of the upper temperature sensing element 7 is equal to or less than the first reference grade L, or the grade of the sensing value DT of the lower temperature sensing element 9 is equal to or less than the second reference grade M, the microcomputer determines that the sunlight is not directly incident on the sensing surface 1 of the sensor casing 3 and determines that the interior temperature of the vehicle is generally increased by the sunlight. Accordingly, the microcomputer 17 outputs the average value of the sensing value UT of the upper temperature sensing element 7 and the sensing value DT of the lower temperature sensing element 9 as the interior temperature of the vehicle.

In addition, when the microcomputer 17 determines that the sensing value UT of the upper temperature sensing element 7 is higher than the sensing value DT of the lower temperature sensing element 9, and a signal from the solar radiation sensor 15 indicates that sunlight is not incident on the vehicle, the microcomputer determines that a disturbance occurs due to a heat source other than the sun, and maintains an output value of the interior temperature of the vehicle at a previous state for a predetermined first reference time.

For example, the disturbance by a heat source other than the sun may be flame of a lighter or a hand of user approaching the sensing surface 1 of the sensor casing 3.

When a situation that the sensing value DT of the lower temperature sensing element 9 is higher than the sensing value UT of the upper temperature sensing element 7 is maintained for a predetermined second reference time, the microcomputer 17 outputs a value as the interior temperature of the vehicle. The value is obtained by subtracting a correction value O using a sensing value of the compensation temperature sensing element 11 from the sensing value DT of the lower temperature sensing element 9, adding the subtracted value to the sensing value UT of the upper temperature sensing element 7, and dividing the added value by two.

As described above, a situation in which the sensing value DT of the lower temperature sensing element 9 is higher than the sensing value UT of the upper temperature sensing element 7 is maintained for a long period of time, as an unintended situation in operation of the interior temperature sensor for the vehicle of the present disclosure, and the situation may be regarded as an effect of disturbance due to heat such as heat in an engine room operated at an opposite side of the vehicle mainly based on the crash pad C. Therefore, the microcomputer 17 generates the correction value O using the sensing value of the compensation temperature sensing element 11 as described above. Then the microcomputer outputs a value as the interior temperature of the vehicle, the value being obtained by subtracting the correction value O from the sensing value DT of the lower temperature sensing element 9, and averaging the subtracted value and the sensing value UT of the upper temperature sensing element 7.

In this case, the interior temperature of the vehicle is obtained by the following expression, the interior temperature=$\{UT+(DT-O)\}/2$.

Here, the correction value O may be calculated using the sensing value of the compensation temperature sensing element 11 as described above, or may be determined to be a predetermined constant value through a plurality of tests in advance.

In addition, the second reference time may be designed to be suitable for intents of the present disclosure, and may be set to three minutes, for example.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. An interior temperature sensor for a vehicle, the sensor comprising:
    a sensor casing disposed to expose a sensing surface thereof to a space that is a subject of temperature measurement;
    a substrate extending in a direction from an inside of the sensing surface toward an outside while at least a part of the substrate bisects an inside of the sensor casing into upper and lower sections;
    an upper temperature sensing element provided on an upper surface of the substrate inside the sensor casing;
    a lower temperature sensing element provided on a lower surface of the substrate inside the sensor casing;
    a compensation temperature sensing element provided on the substrate to be placed outside the sensor casing; and
    a microcomputer configured to receive the sensing values of the upper temperature sensing element and the lower temperature sensing element, and a sensing value of the compensation temperature sensing element, thereby determining the interior temperature of the vehicle,
    wherein when the microcomputer determines that the sensing values of the upper temperature sensing element and the lower temperature sensing element are in a predetermined same range, the microcomputer is configured to output an average value of the sensing values of the upper temperature sensing element and the lower temperature sensing element as the interior temperature of the vehicle.

2. The sensor of claim 1, wherein the substrate is inserted into the sensor casing for separating an upper space inside the sensor casing in which the upper temperature sensing element is exposed and a lower space inside the sensor casing in which the lower temperature sensing element is exposed from each other.

3. The sensor of claim 2, further comprising:
    a blocking member sealing the inside of the sensor casing where the upper temperature sensing element and the lower temperature sensing element are provided, thereby allowing the upper temperature sensing element, the lower temperature sensing element, and the compensation temperature sensing element to be independent from each other in a convective heat transfer.

4. The sensor of claim 3, wherein the blocking member is made of an insulative material.

5. The sensor of claim 1, wherein the space that is the subject of temperature measurement is an interior space of the vehicle and the sensing surface of the sensor casing forms a vertical surface facing toward the interior space of the vehicle.

6. The sensor of claim 1, wherein when the sensing value of the upper temperature sensing element is higher than the sensing value of the lower temperature sensing element, and a solar radiation sensor senses that sunlight is incident on the vehicle, the microcomputer determines whether the sunlight radiated to the vehicle is directly incident on the sensing surface of the sensor casing or not, and the determination is based on a frequency of changing of a difference between the sensing value of the upper temperature sensing element and the sensing value of the lower temperature sensing element, a first rate of change in sensing values of the upper temperature sensing element for a predetermined time period, and a second rate of change in sensing values of the lower temperature sensing element for the predetermined time period.

7. The sensor of claim 6, wherein when the frequency of changing of the difference between the sensing value of the upper temperature sensing element and the sensing value of the lower temperature sensing element exceeds a predetermined reference frequency, the first rate of change in sensing values of the upper temperature sensing element exceeds a predetermined first reference value, and the second rate of change in sensing values of the lower temperature sensing element exceeds a predetermined second reference value, the microcomputer determines that the sunlight is directly incident on the sensing surface of the sensor casing, and as the interior temperature of the vehicle, outputs a value calculated by the following equation:

$$\text{the interior temperature of the vehicle} = \{(UT+DT)/2\} - \{(UT+DT)*\alpha/2\}$$

where,
- UT: a sensing value of the upper temperature sensing element,
- DT: a sensing value of the lower temperature sensing element, and
- α: a weighting value being obtained in consideration of an error generated by direct incidence of the sunlight on the sensing surface of the sensor casing.

8. The sensor of claim 1, wherein, when the sensing value of the upper temperature sensing element is higher than the sensing value of the lower temperature sensing element, and a signal from a solar radiation sensor indicates that sunlight is not incident on the vehicle, the microcomputer determines that a disturbance is occurred due to a heat source other than the sun, and maintains an output value of the interior temperature of the vehicle at a previous state for a predetermined first reference time.

9. The sensor of claim 8, wherein when a state where the sensing value of the lower temperature sensing element is maintained higher than the sensing value of the upper temperature sensing element for a predetermined second reference time, as the interior temperature of the vehicle, the microcomputer outputs a value calculated by the following equation:

$$\text{the interior temperature of the vehicle} = \{UT+(DT-O)\}/2,$$

where,
- UT: a sensing value of the upper temperature sensing element,
- DT: a sensing value of the lower temperature sensing element, and
- O: a correction value using a sensing value of the compensation temperature sensing element.

* * * * *